(12) United States Patent
Kim et al.

(10) Patent No.: US 7,858,241 B2
(45) Date of Patent: Dec. 28, 2010

(54) NONAQUEOUS ELECTROLYTE FOR LITHIUM SECONDARY BATTERY AND LITHIUM SECONDARY BATTER USING THE SAME

(75) Inventors: Jinsung Kim, Gyeonggi-do (KR); Jinbum Kim, Gyeonggi-do (KR); Narae Park, Gyeonggi-do (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 12/138,310

(22) Filed: Jun. 12, 2008

(65) Prior Publication Data

US 2008/0311481 A1     Dec. 18, 2008

(30) Foreign Application Priority Data

Jun. 12, 2007    (KR) .................. 10-2007-0057118

(51) Int. Cl.
*H01M 6/18* (2006.01)
(52) U.S. Cl. .................. 429/307; 429/326; 429/330; 429/332; 429/333; 429/334; 429/335; 429/341
(58) Field of Classification Search .............. 429/307, 429/326, 330, 332, 333, 334, 335, 341
See application file for complete search history.

(56) References Cited

U.S. PATENT DOCUMENTS

2005/0123835 A1* 6/2005 Sun ........................ 429/330
2006/0035144 A1* 2/2006 Shimizu et al. ............ 429/307

FOREIGN PATENT DOCUMENTS

| JP | 11-111333 A | 4/1999 |
|---|---|---|
| JP | 2000-077096 A | 3/2000 |
| JP | 2000-243444 A | 9/2000 |
| KR | 10-2003-0033598 | 5/2003 |
| KR | 10-2004-0010189 A | 1/2004 |
| KR | 10-0602475 | 7/2005 |
| KR | 10-2005-0078443 A | 8/2005 |
| KR | 10-2006-0075970 | 7/2006 |
| KR | 10-2007-0082553 A | 8/2007 |

\* cited by examiner

*Primary Examiner*—Laura S Weiner
(74) *Attorney, Agent, or Firm*—Knobbe, Martens, Olson & Bear, LLP

(57) ABSTRACT

A nonaqueous electrolyte for a lithium secondary battery and a lithium secondary battery including the same are provided. In particular, the nonaqueous electrolyte comprises a compound of chemical formula 1 as an electrolyte additive:

$$NC\text{—}(R^1)_n\text{-}A\text{-}(R^2)_m\text{—}CN \qquad 1$$

wherein, $R^1$ and $R^2$ represent, respectively, alkylene groups, n and m represent integers of 1 to 10, and A is an aromatic hydrocarbon in which the number of carbons is 5 to 9 or O. When the lithium secondary battery is kept at high voltage and temperature, the electrolyte additive reduces gas generation, thereby reducing battery swelling. Therefore, it is possible to reduce a battery thickness increment rate and to increase discharge capacity at a high temperature.

17 Claims, No Drawings

NONAQUEOUS ELECTROLYTE FOR LITHIUM SECONDARY BATTERY AND LITHIUM SECONDARY BATTER USING THE SAME

CROSS-REFERENCE TO RELATED APPLICATION

This application claims the benefit under 35 U.S.C §119 of Korean Patent Application No. 10-2007-57118, filed Jun. 12, 2007 in the Korean Intellectual Property Office, the entire disclosure of which is incorporated herein.

BACKGROUND OF THE INVENTION

1. Technical Field

The present disclosure relates to a nonaqueous electrolyte for a lithium secondary battery and a lithium secondary battery using the same, and more particularly, to a nonaqueous electrolyte for a lithium secondary battery exhibiting improved high-temperature storage characteristics at high voltage and a lithium secondary battery using the same.

2. Description of the Related Art

Batteries refer to apparatuses that convert chemical energy into electrical energy through electrochemical oxidation-reduction reactions of the chemical species in the batteries. Batteries are divided into primary batteries that are discarded when exhausted and secondary batteries that can be recharged and reused a plurality of times.

Conventional small and slim lithium secondary batteries used, for example, in mobile telephones, electronic organizers, and wrist watches include positive-electrode active materials comprising lithium-metal mixed oxides; negative-electrode active materials comprising carbon materials, lithium metal, and electrolytes comprising a lithium salt dissolved in an organic solvent.

To be specific, a typical electrolyte in a lithium secondary battery is obtained by dissolving $LiPF_6$ in a mixture of a cyclic carbonic acid ether, such as propylene carbonate and/or ethylene carbonate, and an open-chain carbonic acid ether, such as dimethyl carbonate, methyl ethyl carbonate, and/or diethyl carbonate. Other organic solvents used in electrolytes include methyl ethyl carbonate (MEC) adopted in about 1993 and methyl propionate.

However, in order to improve the performances of batteries, in particular, high-temperature storage characteristics, specific compounds have been added to the electrolytes therefor. Typically, when specific compounds are added to the electrolyte in order to improve the performance of the battery, certain characteristics of the batteries are improved; however, other characteristics often are made worse. For example, some additives that improve high-temperature storage characteristics reduce the number of charging and discharging cycles possible for the battery.

SUMMARY OF THE INVENTION

In order to solve one or more of the above-described problems, it is one aspect provides a nonaqueous electrolyte for a lithium secondary battery with improved characteristics comprising an electrolyte additive suitable that improves one or more high temperature storage characteristics such as a battery thickness increment rate and a discharging capacity at high voltage and/or temperature; and a lithium secondary battery using the same.

Some embodiments provide an electrolyte for a lithium secondary battery that improves the performance of the battery at high temperatures and/or high voltages, for example, reducing the formation of gas and the resulting swelling of the battery, and/or improving the capacity of the battery. Embodiments of the electrolyte comprise an additive of formula 1:

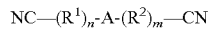

wherein, $R^1$ and $R^2$ are alkylene groups, n and m are independently from about 1 to about 10, and A is an aromatic hydrocarbon nucleus of from about 5 to about 10 carbon atoms, or O.

Accordingly, an aspect provides a nonaqueous electrolyte for a lithium secondary battery including a nonaqueous organic solvent, a lithium salt, and an electrolyte additive of a chemical formula 1:

wherein, $R^1$ and $R^2$ respectively represent alkylene groups, n and m respectively represent integers of 1 to 10, and A is an aromatic hydrocarbon in which the number of carbons is 5 to 9 or O.

According to an example, fluoroethylene carbonate, from 0.1 to 10 wt %, preferably, 1 to 5 wt %, and more preferably, 3 wt %, can be further included. A is preferably benzene or oxygen. The values of n and m are 1 to 5 (e.g., lower alkyl), preferably, 1 to 3, more preferably, 1 to 2 (e.g., $R^1$ and $R^2$ are methyl or ethyl groups).

Therefore, according to an example, a bis(cyanoalkyl)benzene of chemical formula 2 can be used:

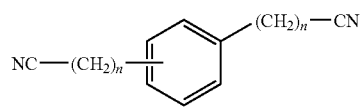

Here, the n is preferably 1 to 5.

The bis(cyanoalkyl)benzene is preferably 1,3-bis(cyanomethyl)benzene or 1,4-bis(cyanomethyl)benzene having following structural formulas, or a compound of the above:

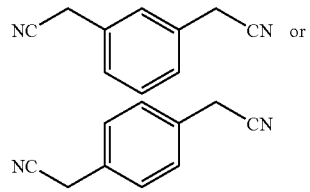

According to an example, a bis(2-cyanoalkyl)ether of the following chemical formula 3 can be used:

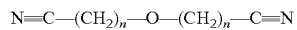

Here, the n is preferably 1 to 5.

According to an example, the additive is preferably bis(2-cyanoethyl)ether.

In addition, the amount of the additive of the chemical formula 1 is 0.1 to 10 wt % with respect to the weight of the electrolyte.

In addition, the nonaqueous organic solvent is selected from the group consisting of carbonates, esters, ethers, and ketones. In addition, the carbonate is selected from the group consisting of dimethyl carbonate (DMC), diethyl carbonate (DEC), dipropyl carbonate (DPC), methylpropyl carbonate (MPC), ethylmethyl carbonate (EMC), ethylpropyl carbonate (EPC), ethylene carbonate, propylene carbonate, 1,2-butylene carbonate, 2,3-butylene carbonate, 1,2-pentylene carbonate, and 2,3-pentylene carbonate.

In addition, the lithium salt is at least one or two compounds selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl, and LiI.

In addition, there is provided a lithium secondary battery including: a nonaqueous electrolyte for a lithium secondary battery including an additive compound of chemical formula 1:

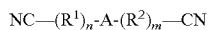

wherein, $R^1$ and $R^2$ respectively represent alkylene groups, n and m respectively represent integers of 1 to 10, and A is an aromatic hydrocarbon in which the number of carbons is 6 to 14 or O; a positive electrode including a positive electrode active material that reversibly intercalates and deintercalates lithium ions; a negative electrode including a negative electrode active material that reversibly intercalates and deintercalates lithium ions; and a sealed case in which the electrolyte, the positive electrode, and the negative electrode are mounted.

According to an example, fluoroethylene carbonate of 0.1 to 10 wt % can be further included.

The definition of the chemical formula 1 is as described above. Therefore, the additive compound according to an example includes bis(cyanoalkyl)benzenes, preferably, 1,3-bis(cyanomethyl)benzene or 1,4-bis(cyanomethyl)benzene, or a bis(cyanoalkyl)ether, preferably bis(2-cyanoethyl)ether.

Some embodiments provide a nonaqueous electrolyte for a lithium secondary battery, and a secondary battery comprising the same, wherein the nonaqueous electrolyte comprises: a nonaqueous organic solvent; a lithium salt; and an electrolyte additive of formula 1:

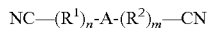

wherein, $R^1$ and $R^2$ are alkylene groups, n and m are independently from about 1 to about 10, and A is an aromatic hydrocarbon nucleus of from about 6 to about 14 carbon atoms, or O.

Some embodiments further comprises from about 0.1 wt % to 10 wt % of fluoroethylene carbonate.

In some embodiments, A is benzene or oxygen. In some embodiments, n and m are independently 1 or 2.

In some embodiments, the compound of formula 1 is a bis(cyanoalkyl)benzene compound of formula 2:

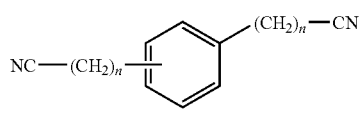

and n is from about 1 to about 5.

In some embodiments, the compound of formula 1 is a bis(2-cyanoalkyl)ether, and n and m are independently from about 1 to about 10. In some embodiments, the bis(2-cyanoalkyl)ether is bis(2-cyanoethyl)ether.

In some embodiments, the electrolyte comprises from about 0.1 wt % to about 10 wt % of the additive of formula 1 with respect to the electrolyte.

In some embodiments, the bis(cyanoalkyl)benzene is 1,3-bis(cyanomethyl)benzene, 1,4-bis(cyanomethyl)benzene, or a mixture thereof.

In some embodiments, the nonaqueous organic solvent comprises at least one of a carbonate, an ether, an ester, and a ketone. In some embodiments, the carbonate comprises at least one of dimethyl carbonate (DMC), diethyl carbonate (DEC), dipropyl carbonate (DPC), methylpropyl carbonate (MPC), ethylmethyl carbonate (EMC), ethylpropyl carbonate (EPC), ethylene carbonate, propylene carbonate, 1,2-butylene carbonate, 2,3-butylene carbonate, 1,2-pentylene carbonate, and 2,3-pentylene carbonate.

In some embodiments, the lithium salt comprises at least one of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_2$, $LiAlCl_4$, LiCl, and LiI.

Some embodiments of the lithium secondary battery further comprise: a positive electrode comprising a positive electrode active material that reversibly intercalates and deintercalates lithium ions; a negative electrode comprising a negative electrode active material that reversibly intercalates and deintercalates lithium ions; and a sealed case in which the electrolyte, the positive electrode, and the negative electrode are disposed.

In some embodiments, the positive electrode comprises a positive electrode coating portion comprising an aluminum compound. In some embodiments, a mol % of the aluminum in the aluminum compound is from about 0.2 mol % to about 0.9 mol %, with respect to the positive electrode active material.

Some embodiments further comprise a separator disposed between the positive electrode and the negative electrode.

DETAILED DESCRIPTION OF CERTAIN EMBODIMENTS

Hereinafter, certain embodiments will be described in detail.

In some embodiments, a nonaqueous electrolyte for a lithium secondary battery comprises a nonaqueous organic solvent, a lithium salt, and an electrolyte additive of formula 1:

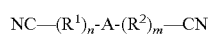

wherein, $R^1$ and $R^2$ are alkylene groups, n and m are independently from about 1 to about 10, and A is an aromatic hydrocarbon nucleus of from about 5 to about 10 carbon atoms, or O. $R^1$ and $R^2$ may be straight-chain, branched, and/or cyclic. In some embodiments, A is benzene or oxygen. In some embodiments, n and m are independently lower alkylene, for example, from about 1 to about 3, preferably, independently 1 or 2 (e.g., methyl or ethyl). As used herein, the term "alkylene" is used in its usual sense, for example, referring to an alkanediyl.

Some embodiments of the additive comprise a bis(cyanoalkyl)benzene of formula 2:

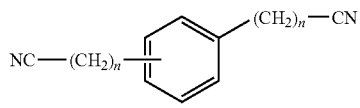

wherein, n is from about 1 to about 5.

In some embodiments, the bis(cyanoalkyl)benzene of formula 2 is 1,3-bis(cyanomethyl)benzene, 1,4-bis(cyanomethyl)benzene, or a compound thereof.

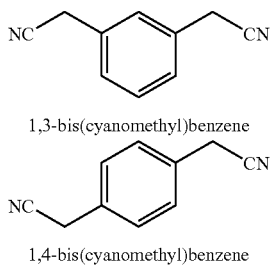

1,3-bis(cyanomethyl)benzene 1,4-bis(cyanomethyl)benzene

Some embodiments of the additive comprise a bis(2-cyanoalkyl)ether of formula 3:

$$N\equiv C-(CH_2)_n-O-(CH_2)_m-C\equiv N \qquad 3$$

wherein, n and m are independently from about 1 to about 5. In some embodiments n and m have the same value. In some embodiments, the compound of formula 3 is bis(2-cyanoethyl)ether (n=m=2).

In some embodiments, the electrolyte comprises from about 0.1 wt % to about 10 wt % of the additive of formula 1 with respect to the weight of the electrolyte.

In addition, the nonaqueous organic solvent is selected from the group consisting of carbonates, esters, ethers, and ketones. Embodiments of the additive include bis(cyanoalkyl)benzene compounds that are ortho-substituted, para-substituted, meta-substituted, or a mixture of ortho-substituted, para-substituted, and meta-substituted bis(cyanoalkyl)benzenes. When a CN group is directly bonded with an atom of the benzene ring that comprises a connection center A, high-temperature storage characteristics are reduced due to an increase in reactivity. On the other hand, when an alkylene group, such as a $CH_2$ group, is introduced between the benzene ring and the CN group, the resultant material improves the high-temperature storage characteristics of the resulting battery.

When a battery comprising an additive comprising a bis(cyanoalkyl)benzene is kept at a high temperature at a high voltage of from about 4.2 V to about 4.4 V, swelling caused by gas generation is reduced so that a battery thickness increment rate is reduced. In some embodiments, the temperatures are greater than about 70° C., greater than about 80° C., and/or greater than about 100° C., or up to about 120° C. In some embodiments, the voltages are greater than about 4 V, 4.2 V, and/ or 4.4 V, or up to about 4.5 V.

In addition, when the additive comprises a bis(2-cyanoalkyl)ether comprising an oxygen atom instead of a benzene ring as the connection center, when the battery is kept at a high temperature at a high voltage of 4.4 V, the swelling caused by gas generation is reduced so that the battery thickness increment rate is reduced.

According to some embodiments, the positive electrode active material used for the secondary battery preferably an aluminum compound. In particular, the aluminum compound preferably comprises alumina coating a positive electrode coating portion. The positive electrode coating portion is preferably coated with the alumina so that the amount of aluminum in the coating comprises from about 0.2 mol % to about 0.9 mol %, preferably, about 0.5 mol % with respect to the positive electrode active material.

Embodiments of the electrolyte include a nonaqueous organic solvent and lithium salt. The lithium salt serves as a source of supply of lithium ions in the battery to enable the lithium battery to operate. The nonaqueous organic solvent serves as a medium through which $Li^+$ ions that participate in the electrochemical reaction of the battery move.

One or a mixture of at least two compounds selected from the group consisting of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_2$, $LiAlCl_4$, LiCl, and LiI may be used as the lithium salt. The concentration of the lithium salt is preferably in the range of from about 0.6 M to about 2 M, and more preferably, in the range of from about 0.7 M to about 1.6 M. In some embodiments in which the concentration of the lithium salt is less than about 0.6 M, a reduced conductivity of the electrolyte reduce the performance of the electrolyte. In some embodiments in which the concentration of the lithium salt is greater than about 2 M, an increased viscosity of the electrolyte reduces the mobility of the lithium ions.

Carbonates, esters, ethers, ketones, and mixtures thereof may be used as the nonaqueous organic solvent. In the nonaqueous organic solvent, a mixture of at least one cyclic carbonate and at least one open chain carbonate is preferably used as a carbonate-based solvent. In this case, the cyclic carbonate and the open chain carbonate are preferably mixed with each other in a volumetric ratio of from about 1:1 to about 1:9, and more preferably, in a volumetric ratio of from about 1:1.5 to about 1:4. Embodiments of high performance electrolytes comprise a cyclic carbonate and an open chain carbonate mixed with each other in the above-described volumetric ratios.

Ethylene carbonate (EC), propylene carbonate (PC), 1,2-butylene carbonate, 2,3-butylene carbonate, 1,2-pentylene carbonate, and 2,3-pentylene carbonate may be used as the cyclic carbonate. The dielectric constants of the ethylene carbonate and the propylene carbonate are relatively high. Ethylene carbonate has a high melting point and is typically mixed with another solvent. When graphite is used as a negative electrode active material, propylene carbonate, which has a low decomposition voltage, is not used or the amount of the propylene carbonate is reduced in some embodiments.

Dimethyl carbonate (DMC), diethyl carbonate (DEC), dipropyl carbonate (DPC), methylpropyl carbonate (MPC), ethylmethyl carbonate (EMC), and ethylpropyl carbonate (EPC) may be used as the open chain carbonate. Among the above-described carbonates, dimethyl carbonate, ethylmethyl carbonate, and diethyl carbonate, which have low viscosities, are preferably used as the open chain carbonate.

Methyl acetate, ethyl acetate, propyl acetate, methyl propionate, ethyl propionate, γ-butyrolactone, γ-valerolactone, γ-caprolactone, δ-valerolactone, and ε-caprolactone may be used as the ester. Tetrahydrofuran, 2-methyltetrahydrofuran, and dibutylether may be used as the ether. Poly(methylvinyl ketone) may be used as the ketone.

The lithium secondary battery includes a positive electrode and a negative electrode.

The positive electrode includes at least one positive electrode active material that can intercalate and deintercalate lithium ions. Mixed metal oxides comprising lithium and at least one metal selected from the group consisting of Co, Mn, and Ni are preferably used as the positive electrode active materials. Mixed metal oxides used as the positive electrode active materials may further comprise at least one metal selected from the group consisting of Mg, Al, Co, K, Na, Ca, Si, Ti, Sn, V, Ge, Ga, B, As, Zr, Mn, Cr, Fe, Sr, V, and a rare earth element. The solid solubility of the metals in the mixed metal oxides can vary.

The negative electrode includes negative electrode active materials that can intercalate and deintercalate lithium ions. Carbon materials such as crystalline carbon, amorphous carbon, carbon composites, carbon fiber, lithium metal, and lithium alloys may be used as the negative electrode active materials. Amorphous carbon comprises, for example, hard carbon, coke, mesocarbon microbead (MCMB) annealed at a temperature not more than 1,500° C., and mesogroup pitch-based carbon fiber (MPCF). Examples of crystalline carbon include graphite-based materials such as natural graphite, graphitized coke, graphitized MCMB, and graphitized MPCF. A material in which an interplanar distance d002 is in the range of from about 3.35 Å to about 3.38 Å, and in which a crystallite size Lc, measured, for example, by X-ray diffraction, is not less than about 20 nm is preferably used as the carbon material. Some embodiments of negative electrode active materials comprise other elements that form alloys with lithium are Al, Zn, Bi, Cd, Sb, Si, Pb, Sn, Ga, and In.

Electrode active materials, a binder, and a conductive agent and, if desired, a thickener are dispersed in a solvent to obtain an electrode slurry composition, which is coated on an electrode collector, thereby providing the positive electrode or the negative electrode. Aluminum or an aluminum alloy may be used as a positive electrode collector, for example. Copper or a copper alloy may be used as a negative electrode collector, for example. A foil or a mesh may be used as the positive electrode collector and the negative electrode collector.

The binder makes an active materials paste, which adheres the active materials to each other, adheres the active materials to the collector, and/or buffers the expansion and contraction of the active materials. For example, polyvinylidenefluoride (PVdF), a copolymer of polyhexafluoropropylene-polyvinylidenefluoride (P(VdF/HFP)), poly(vinyl acetate), poly(vinyl alcohol), poly(ethylene oxide), polyvinylpyrrolidone, alkylated poly(ethylene oxide), poly(vinyl ether), poly(methyl methacrylate), poly(ethyl acrylate), polytetrafluoroethylene, polyvinylchloride, polyacrylonitrile, polyvinylpyridine, styrene-butadiene rubber, and acrylonitrile-butadiene rubber may be used as the binder. The amount of the binder is preferably in the range of from about 0.1 wt % to about 30 wt % based on the weight of the electrode active materials, and more preferably, is in the range of from about 1 wt % to about 10 wt %. In some embodiments comprising too little binder, the adhesive strength between the electrode active materials and the collector is insufficient. In some embodiments comprising too much binder, the adhesive strength between the electrode active materials and the collector improves; however, the amount of the electrode active materials is reduced, thereby relatively reducing the capacity of the battery.

The conductive agent improves electrical conductivity and comprises at least one material selected from the group consisting of graphite-based conductive agents, carbon black-based conductive agents, and metal-based or metal compound-based conductive agents. Artificial graphite and natural graphite may be used as the graphite-based conductive agent. Acetylene black, Ketjen black (Ketjen Black Int'l), Denka black (Denki Kagaku Kogyo), thermal black, and channel black may be used as the carbon black-based conductive agent. Perovskite materials such as Sn, $SnO_2$, $SnPO_4$, $TiO_2$, $KTiO_3$, $LaSrCoO_3$, and $LaSrMnO_3$ may be used as the metal-based or metal compound-based conductive agent. However, the conductive agent is not limited to the above-described conductive agents.

The amount of the conductive agent is preferably in the range of from about 0.1 wt % to about 10 wt % based on the weight of the electrode active materials. In some embodiments in which the amount of the conductive agent is less than about 0.1 wt %, the electrochemical reaction in the battery slows. In some embodiments in which the amount of the conductive agent is greater than about 10 wt %, the energy density per weight of the battery is reduced.

Any materials that can control the viscosity of the active material slurry may be used as the thickener. For example, carboxymethylcellulose, hydroxymethylcellulose, hydroxyethylcellulose, and hydroxypropylcellulose may be used as the thickener.

A nonaqueous solvent or an aqueous solvent is used as the solvent into which the electrode active materials, the binder, and the conductive agent are dispersed. N-methyl-2-pyrrolidone (NMP), dimethylformamide, dimethylacetamide, N,N-dimethylaminopropylamine, ethylene oxide, and tetrahydrofuran may be used as the nonaqueous solvent.

The lithium secondary battery may include a separator for preventing the positive electrode and the negative electrode from short circuiting and for providing a path through which the lithium ions move. Polyolefin-based polymer layers such as polypropylene, polyethylene, polyethylene/polypropylene, polyethylene/polypropylene/polyethylene, polypropylene/polyethylene/polypropylene, multi-layers of the above-described polyolefin-based polymer layers, a fine porous film, fabric or cloth, and non-woven fabrics may be used as the separator. Also, a film obtained by coating a porous polyolefin film with a stable resin may be used as the separator.

Hereinafter, the preferred examples, comparative examples, and experimental examples of the electrolyte will be described in detail.

EXAMPLE 1

$LiCoO_2$ as a positive electrode active material, polyvinylidene fluoride (PVdF) as a binder, and carbon as a conductive agent were mixed with each other in a weight ratio of 92:4:4 and then, the resultant mixture was dispersed into N-methyl-2-pyrrolidone to manufacture a positive electrode slurry. An Al foil having a thickness of 20 μm was coated with the slurry and then, dried and rolled to manufacture a positive electrode. Artificial graphite as a negative electrode active material, styrene-butadiene rubber as a binder, and carboxymethylcellulose as a thickener were mixed with each other in a weight ratio of 96:2:2 and then, the resultant mixture was dispersed into water to manufacture a negative electrode active material slurry. A Cu foil having a thickness of 15 μm was coated with the slurry and then, dried and rolled to manufacture a negative electrode.

A film separator formed of polyethylene (PE) with a thickness of 20 μm was interposed between the manufactured electrodes and then, the electrodes with the film separator interposed were wound and compressed, then inserted into a prismatic-type can with a size of 553450. An electrolyte was injected into the prismatic-type can to manufacture a lithium secondary battery. The electrolyte was $LiPF_6$ (1 M) as the basic electrolyte, a mixture of ethylene carbonate:ethylmethyl carbonate:diethyl carbonate as a nonaqueous organic solvent (1:1:1), fluoroethylene carbonate (5 wt %), and 1,3-bis(cyanomethyl)benzene (2 wt %) as the additive.

EXAMPLE 2

EXAMPLE 2 differed from EXAMPLE 1 in that 5 wt % of 1,3-bis(cyanomethyl)benzene was used as the additive.

EXAMPLE 3

EXAMPLE 3 differed from EXAMPLE 1 in that 2 wt % of 1,4-bis(cyanomethyl)benzene was used as the additive.

EXAMPLE 4

EXAMPLE 4 differed from EXAMPLE 1 in that the 5 wt % 1,4-bis(cyanomethyl)benzene of was used as the additive.

COMPARATIVE EXAMPLE 1

COMPARATIVE EXAMPLE 1 differed from EXAMPLE 1 in that an electrolyte additive was not added.

COMPARATIVE EXAMPLE 2

COMPARATIVE EXAMPLE 2 differed from EXAMPLE 1 in that 5 wt % of 1,3-dicyanobenzene was used instead of the 1,3-bis(cyanomethyl)benzene.

EXAMPLE 5

EXAMPLE 5 differed from EXAMPLE 1 in that 2 wt % bis(2-cyanoethyl)ether was used instead of the 1,3-bis(cyanomethyl)benzene.

EXAMPLE 6

EXAMPLE 6 differed from EXAMPLE 1 in that 5 wt % of bis(2-cyanoethyl)ether was used instead of the 1,3-bis(cyanomethyl)benzene.

EXAMPLE 7

EXAMPLE 7 differed from EXAMPLE 1 in that 10 wt % of bis(2-cyanoethyl)ether was used as the additive.

EXAMPLE 8

$LiCoO_2$ as a positive electrode active material, polyvinylidene fluoride (PVdF) as a binder, and carbon as a conductive agent were mixed with each other in a weight ratio of 92:4:4 and then, the resultant mixture was dispersed into N-methyl-2-pyrrolidone to manufacture a positive electrode slurry. An Al foil having a thickness of 20 µm was coated with the slurry, dried, rolled, and coated with alumina so that the amount of Al in the coating was 0.5 mol % of the positive electrode material, thereby manufacturing a positive electrode. Artificial graphite as a negative electrode active material, styrene-butadiene rubber as a binder, and carboxymethylcellulose as a thickener were mixed with each other in a weight ratio of 96:2:2 and then, the resultant mixture was dispersed into water to manufacture a negative electrode active material slurry. A Cu foil having a thickness of 15 µm was coated with the slurry and then, dried and rolled to manufacture a negative electrode.

A film separator formed of polyethylene (PE) with a thickness of 20 µm was interposed between the manufactured electrodes and then, the electrodes with the film separator interposed wound and compressed, then inserted into a prismatic-type can with a size of 553450. An electrolyte was injected into the prismatic-type can to manufacture a lithium secondary battery. The electrolyte was LiPF6 (1 M) as the basic electrolyte, ethylene carbonate:ethylmethyl carbonate:diethyl carbonate as a nonaqueous organic solvent (1:1:1), fluoroethylene carbonate (5 wt %), and bis(2-cyanoethyl)ether (2 wt %) as the additive.

EXAMPLE 9

EXAMPLE 9 differed from EXAMPLE 8 in that 5 wt % of bis(2-cyanoethyl)ether was used as the electrolyte additive.

EXAMPLE 10

EXAMPLE 10 differed from EXAMPLE 8 in that 10 wt % of bis(2-cyanoethyl)ether was used as the electrolyte additive.

EXAMPLE 11

EXAMPLE 11 differed from EXAMPLE 8 in that the 5 wt % of bis(2-cyanoethyl)ether was used of % as the electrolyte additive without coating the positive electrode active material with alumina.

COMPARATIVE EXAMPLE 3

COMPARATIVE EXAMPLE 3 differed from the EXAMPLE 8 in that an additive was not used.

COMPARATIVE EXAMPLE 4

COMPARATIVE EXAMPLE 4 differed from the EXAMPLE 8 in that the positive electrode active material was not coated with alumina and that 5 wt % of succinonitrile was used as the additive.

The following experiments confirmed the charging and discharging efficiency, and high-temperature storage characteristics of the lithium secondary batteries of EXAMPLES 1 to 11 and COMPARATIVE EXAMPLES 1 to 4. The experiments were performed at 4.2 V and 4.4 V.

EXPERIMENTAL EXAMPLE 1

Increment Rate of Thickness After Keeping Each Battery at 85° C. for Four Days

Each battery was charged at constant current and voltage of 0.5 C/4.2 V for three hours, then kept at 85° C. for four days and the increment rate (%) of the thickness of the battery was calculated as follows:

Increment rate (%) of the thickness of a battery=(the final thickness−the initial thickness/the initial thickness)×100(%)

EXPERIMENTAL EXAMPLE 2

Discharge Capacity After Keeping Each Battery at 85° C. for Four Days

Each battery was charged at constant current and voltage of 0.5 C/4.2 V for three hours, kept at 85° C. for four days, then discharged at constant current and voltage of 0.5 C/3 V to measure discharge capacity.

EXPERIMENTAL EXAMPLE 3

Life Cycle

Each battery was charged at a room temperature at 950 mA, and constant current and voltage of 0.1 C/4.2 V for three hours, then discharged after ten minutes at constant current of 1 C/3.1 V. The charge and discharge were performed for 300 cycles and the capacity maintenance rate (%) at the 300th cycle was calculated as follows:

Capacity maintenance rate (%) at 300th cycle=(the discharge capacity at 300th cycle/the discharge capacity at first cycle)×100(%)

The results obtained by the EXPERIMENTAL EXAMPLES 1 to 3 are provided in TABLES 1 to 3.

TABLE 1

| | 1,3-dicyano-benzene (wt %) | 1,3-bis(cyanomethyl)-benzene (wt %) | 1,4-bis(cyanomethyl)-benzene (wt %) | 85° C. thickness increment rate | 85° C. discharge capacity |
|---|---|---|---|---|---|
| 4.2 V | | | | | |
| COMPARATIVE EXAMPLE 1 | — | — | — | 40.3% | 85.3% |
| COMPARATIVE EXAMPLE 2 | 2 | — | — | 51.5% | 55.0% |
| EXAMPLE 1 | 2 | — | — | 31.0% | 86.8% |
| EXAMPLE 2 | 5 | — | — | 27.0% | 86.0% |
| EXAMPLE 3 | — | 2 | — | 30.5% | 86.2% |
| EXAMPLE 4 | — | 5 | — | 29.8% | 85.9% |
| 4.4 V | | | | | |
| COMPARATIVE EXAMPLE 1 | — | — | — | 69.0% | 69.9% |
| EXAMPLE 1 | 2 | — | — | 34.7% | 75.8% |
| EXAMPLE 2 | 5 | — | — | 27.7% | 73.8% |
| EXAMPLE 3 | — | 2 | — | 38.5% | 74.2% |
| EXAMPLE 4 | — | 5 | — | 28.7% | 72.0% |

TABLE 2

| | bis(2-cyanoethyl) ether | Capacity at 300th cycle | Thickness increment rate at 85° C. | Discharge capacity at 85° C. |
|---|---|---|---|---|
| 4.2 V | | | | |
| COMPARATIVE EXAMPLE 1 | — | 91.7% | 35.3% | 85.3% |
| EXAMPLE 5 | 2 | 91.6% | 24.6% | 85.8% |
| EXAMPLE 6 | 5 | 90.6% | 19.8% | 85.0% |
| 4.4 V | | | | |
| COMPARATIVE EXAMPLE 1 | — | | 69.0% | 69.9% |
| EXAMPLE 5 | 2 | | 41.2% | 82.0% |
| EXAMPLE 6 | 5 | | 35.5% | 81.0% |
| EXAMPLE 7 | 10 | | 24.0% | 78.8% |

TABLE 3

| | Al coating (mol %) | succinonitrile | bis(2-cyanoethyl) ether | Thickness increment rate | Maintenance capacity |
|---|---|---|---|---|---|
| 4.4 V | | | | | |
| COMPARATIVE EXAMPLE 3 | 0.5 | — | — | 69.0% | 69.9% |
| COMPARATIVE EXAMPLE 4 | — | 5 | — | 60.3% | 55.2% |
| EXAMPLE 8 | 0.5 | — | 2 | 41.2% | 81.5% |
| EXAMPLE 9 | 0.5 | — | 5 | 35.5% | 80.7% |
| EXAMPLE 10 | 0.5 | — | 10 | 24.0% | 78.8% |
| EXAMPLE 11 | — | — | 5 | 42.0% | 80.5% |

As shown in the TABLE 1, in the cases in which the electrolyte additive was not added, when the battery is kept at high voltage and temperature, the thickness of the battery increased due to the generation of a gas and the discharge capacity was reduced. On the other hand, when meta- or para-bis(cyanomethyl)benzene was added, the battery thickness increment rate was reduced and the maintenance capacity was increased at a high temperature. Therefore, it is believed that the electrolyte additive reduces the generation of the gas to reduce the battery thickness increment rate.

In addition, as shown in the TABLE 2, in the cases in which bis(2-cyanoethyl) ether was added, at 4.2 V, the battery thickness increment rate was reduced and the maintenance capacity was increased at a high temperature. As shown, bis(2-cyanoethyl) ether at 0.1 wt % to 10 wt % was added. In particular, bis(2-cyanoethyl)ether was most effective at 2 wt % to 5 wt %. In the case in which 2-cyanoethyl ether was not added, the lifespan characteristic over 300 charge and discharge cycles was similar to the case the in which 2-cyanoethyl ether was added. However, the high-temperature storage characteristics were reduced.

In addition, as shown in the TABLE 3, in the case in which succinonitrile or 10 wt % of 2-cyanoethyl ether was added at 4.4 V, when the battery was kept at a high temperature, the battery thickness increment rate was reduced due to a reduced generation of gas. In addition, when the battery thickness increment rate is compared with the battery thickness increment rates of the COMPARATIVE EXAMPLES 3 to 5 in which the electrolyte additive was not added, it is believed that the electrolyte additive significantly reduces the swelling of the battery at a high temperature. In addition, the discharge capacity at a high temperature was not less than 80% in the examples in which the electrolyte additive was added. However, in the comparative EXAMPLES 1 to 4 in which the electrolyte additive was not added, the discharge capacity at a high temperature was slightly greater than 50%.

As described above and as shown in the examples and in TABLES 1 to 3, embodiments of secondary batteries comprising a the compound of chemical formula 1 as an electrolyte additive, in particular, a bis(cyanoalkyl)benzene, in particular, 1,3-bis(cyanomethyl)benzene or 1,4-bis(cyanomethyl)benzene, or a bis(2-cyanoalkyl)ether, in particular, bis(2-cyanoethyl)ether was added to the electrolyte, the generation of the gas was reduced when the battery was kept at a high voltage, for example, from 4.2 V to 4.4 V, and at a high temperature, for example, 85° C., so that swelling of the battery was reduced or prevented, and the discharge capacity and maintenance capacity was increased.

Although certain examples have been shown and described, it would be appreciated by those skilled in the art that changes might be made without departing from the principles and spirit of the disclosure, the scope of which is defined in the claims and their equivalents.

What is claimed is:

1. A nonaqueous electrolyte for a lithium secondary battery comprising:
    a nonaqueous organic solvent;
    a lithium salt; and
    an electrolyte additive of formula 1:

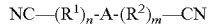

wherein, $R^1$ and $R^2$ are alkylene groups, n and m are independently from about 1 to about 10, and A is an aromatic hydrocarbon nucleus of from about 6 to about 14 carbon atoms.

2. The nonaqueous electrolyte of claim 1, further comprising:
    from about 0.1 wt % to about 10 wt % of fluoroethylene carbonate.

3. The nonaqueous electrolyte according to claim 1, wherein A is benzene.

4. The nonaqueous electrolyte according to claim 1, wherein n and m are independently 1 or 2.

5. The nonaqueous electrolyte according to claim 1, wherein
    the compound of formula 1 is a bis(cyanoalkyl)benzene compound of formula 2:

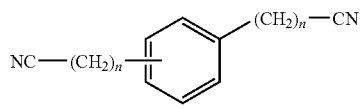

and n is from about 1 to about 5.

6. The nonaqueous electrolyte according to claim 5, wherein the bis(cyanoalkyl)benzene is 1,3-bis(cyanomethyl)benzene, 1,4-bis(cyanomethyl)benzene, or a mixture thereof.

7. The nonaqueous electrolyte according to claim 1, wherein the electrolyte comprises from about 0.1 wt % to about 10 wt % of the additive of formula 1 with respect to the electrolyte.

8. The nonaqueous electrolyte according to claim 1, wherein the nonaqueous organic solvent comprises at least one of a carbonate, an ether, an ester, and a ketone.

9. The nonaqueous electrolyte according to claim 8, wherein the carbonate comprises at least one of dimethyl carbonate (DMC), diethyl carbonate (DEC), dipropyl carbonate (DPC), methylpropyl carbonate (MPC), ethylmethyl carbonate (EMC), ethylpropyl carbonate (EPC), ethylene carbonate, propylene carbonate, 1,2-butylene carbonate, 2,3-butylene carbonate, 1,2-pentylene carbonate, and 2,3-pentylene carbonate.

10. The nonaqueous electrolyte according to claim 1, wherein the lithium salt comprises at least one of $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_2$, $LiAlCl_4$, LiCl, and LiI.

11. A lithium secondary battery comprising:
    the nonaqueous electrolyte of claim 1;
    a positive electrode comprising a positive electrode active material that reversibly intercalates and deintercalates lithium ions;
    a negative electrode comprising a negative electrode active material that reversibly intercalates and deintercalates lithium ions; and
    a sealed case in which the electrolyte, the positive electrode, and the negative electrode are disposed.

12. The lithium secondary battery according to claim 11, wherein the positive electrode comprises a portion thereof coated with an aluminum compound.

13. The lithium secondary battery according to claim 12, wherein a mol % of the aluminum in the aluminum compound is from about 0.2 mol % to about 0.9 mol %, with respect to the positive electrode active material.

14. The lithium secondary battery according to claim 11, further comprising a separator disposed between the positive electrode and the negative electrode.

15. The lithium secondary battery according to claim 11, wherein the compound of formula 1
    is a bis(cyanoalkyl)benzene compound of formula 2:

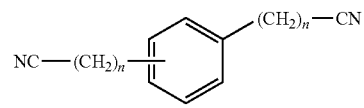

and n is from about 1 to about 5.

16. The lithium secondary battery according to claim 11, wherein the electrolyte comprises from about 0.1 wt % to about 10 wt % of the additive of formula 1 with respect to the electrolyte.

17. The lithium secondary battery according to claim 11, wherein the electrolyte additive is at least one of 1,3-bis(cyanomethyl)benzene or 1,4-bis(cyanomethyl)benzene.

* * * * *

UNITED STATES PATENT AND TRADEMARK OFFICE
CERTIFICATE OF CORRECTION

PATENT NO.        : 7,858,241 B2                                   Page 1 of 1
APPLICATION NO.   : 12/138310
DATED             : December 28, 2010
INVENTOR(S)       : Kim et al.

It is certified that error appears in the above-identified patent and that said Letters Patent is hereby corrected as shown below:

At the title page, Item 54, Title, please change "BATTER" to --BATTERY--.

At Column 1, line 3, please change "BATTER" to --BATTERY--.

At Column 9, line 53, please change "LiPF6" to --$LiPF_6$--.

At Column 13, line 45, Claim 2, please change "claim 1," to --claim 1--.

Signed and Sealed this
Fourteenth Day of June, 2011

David J. Kappos
*Director of the United States Patent and Trademark Office*